United States Patent
McIntosh et al.

(10) Patent No.: US 10,112,719 B2
(45) Date of Patent: Oct. 30, 2018

(54) DEPLOYABLE CLEARANCE PANEL SYSTEM, METHOD, AND ASSEMBLY FOR A MONUMENT WITHIN AN INTERNAL CABIN OF AN AIRCRAFT

(71) Applicant: THE BOEING COMPANY, Chicago, IL (US)

(72) Inventors: Darren Carl McIntosh, Mukilteo, WA (US); Jeff S. Siegmeth, Bothell, WA (US)

(73) Assignee: The Boeing Company, Chicago, IL (US)

( * ) Notice: Subject to any disclaimer, the term of this patent is extended or adjusted under 35 U.S.C. 154(b) by 193 days.

(21) Appl. No.: 15/073,704

(22) Filed: Mar. 18, 2016

(65) Prior Publication Data

US 2017/0267353 A1    Sep. 21, 2017

(51) Int. Cl.

| B64D 11/06 | (2006.01) |
|---|---|
| B64D 11/02 | (2006.01) |
| B64D 11/04 | (2006.01) |
| B64D 11/00 | (2006.01) |
| B64D 25/02 | (2006.01) |

(52) U.S. Cl.
CPC ...... *B64D 11/0606* (2014.12); *B64D 11/0023* (2013.01); *B64D 11/02* (2013.01); *B64D 11/04* (2013.01); *B64D 25/02* (2013.01)

(58) Field of Classification Search
CPC ............ B64D 11/0023; B64D 11/0606; B64D 25/02; B60R 21/026
USPC ............................... 296/24.4, 24.43; 280/748
See application file for complete search history.

(56) References Cited

U.S. PATENT DOCUMENTS

| 3,423,121 | A | * | 1/1969 | Lipkin | B60R 21/06 160/229.1 |
|---|---|---|---|---|---|
| RE27,942 | E | * | 3/1974 | Setina | B60R 21/12 280/748 |
| 3,931,994 | A | * | 1/1976 | Palmiter | B60H 1/00592 280/748 |
| 5,085,382 | A | * | 2/1992 | Finkenbeiner | B64C 1/10 188/371 |
| 5,165,626 | A | * | 11/1992 | Ringger | B64D 11/0023 16/282 |
| 5,238,282 | A | * | 8/1993 | Watson | B60H 1/00592 296/24.41 |
| 5,482,230 | A | | 1/1996 | Bird | |
| 7,380,853 | B2 | * | 6/2008 | Wells | B60R 21/026 280/749 |

(Continued)

FOREIGN PATENT DOCUMENTS

| EP | 2551196 | 1/2013 |
|---|---|---|
| WO | WO 9301088 | 1/1993 |

OTHER PUBLICATIONS

Extended European Search Report for EP 17153377.1-1754, dated Jul. 21, 2017.

*Primary Examiner* — Philip J Bonzell
*Assistant Examiner* — Michael B Kreiner
(74) *Attorney, Agent, or Firm* — Joseph M. Butscher; The Small Patent Law Group, LLC

(57) ABSTRACT

A monument is configured to be positioned within an internal cabin of a vehicle. The monument includes a deployable portion. The deployable portion is configured to move from a non-deployed state into a deployed state when a force that meets or exceeds a predetermined threshold is exerted into the monument wall assembly.

32 Claims, 15 Drawing Sheets

(56) References Cited

U.S. PATENT DOCUMENTS

| | | | |
|---|---|---|---|
| 8,523,220 B1 | 9/2013 | Gehret | |
| 8,689,496 B2 * | 4/2014 | Ple | B64D 11/0023 16/222 |
| 8,960,602 B2 * | 2/2015 | Neumann | B64D 11/0023 244/118.5 |
| 9,254,918 B2 * | 2/2016 | Young | B64D 11/02 |
| 9,428,132 B2 * | 8/2016 | Obadia | B60R 21/20 |
| 2013/0009430 A1 * | 1/2013 | Islam | B60R 21/04 297/216.1 |
| 2014/0027574 A1 | 1/2014 | Obadia | |
| 2015/0375844 A1 * | 12/2015 | Smithson | B32B 5/22 244/121 |

\* cited by examiner

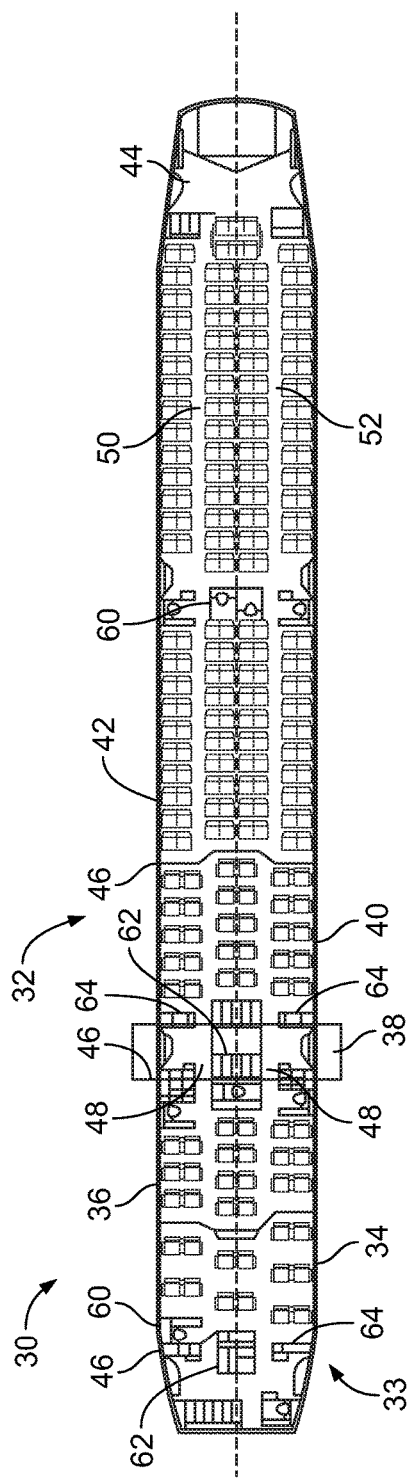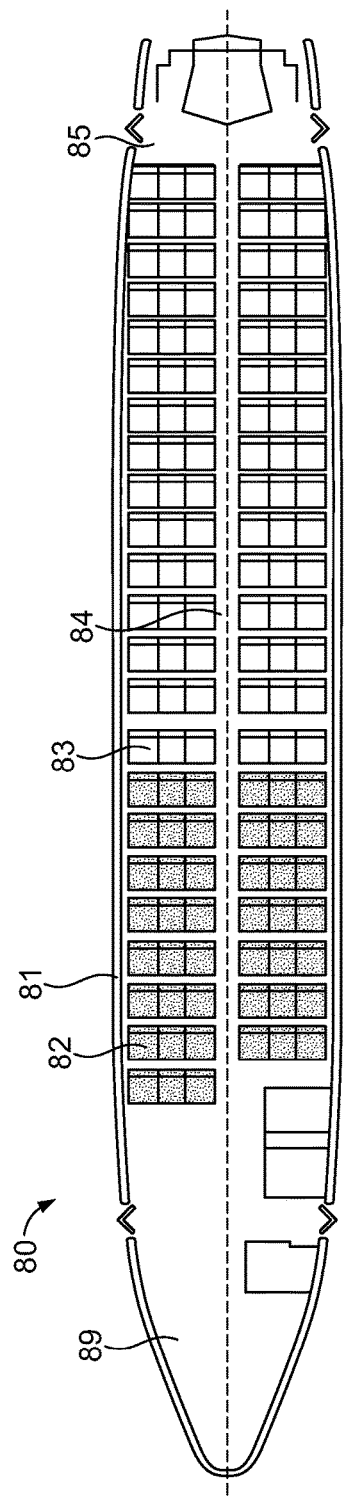
FIG. 2A
FIG. 2B

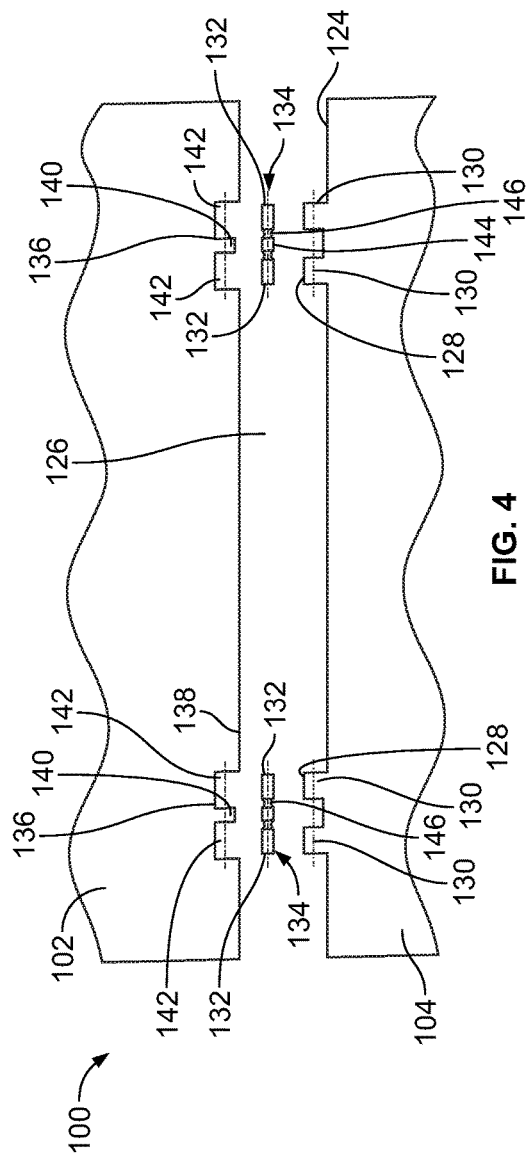
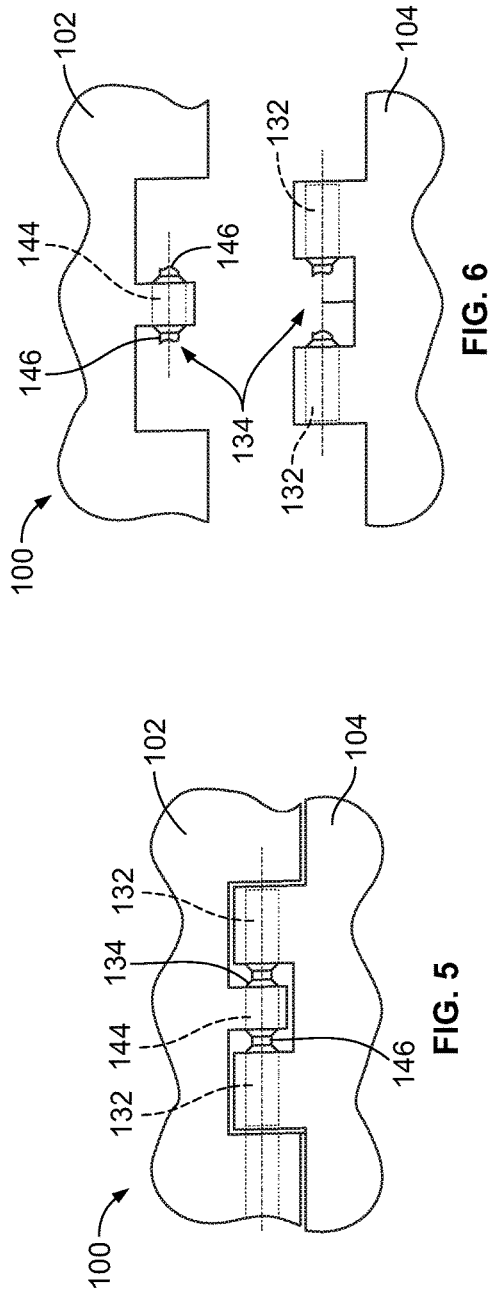

DEPLOYABLE CLEARANCE PANEL SYSTEM, METHOD, AND ASSEMBLY FOR A MONUMENT WITHIN AN INTERNAL CABIN OF AN AIRCRAFT

FIELD OF THE DISCLOSURE

Embodiments of the present disclosure generally relate to deployable clearance panel systems, methods, and assemblies, such as part of a monument within an internal cabin of an aircraft.

BACKGROUND OF THE DISCLOSURE

Commercial aircraft typically include numerous rows of seats securely fixed in position within an interior cabin. A first class section, a business class section, and an economy class section may be within the interior cabin. Each section of the aircraft may have rows of seats spaced apart from one another.

The interior cabin of the aircraft may also include one or more monuments, such as lavatories, galleys, closets, partitions, and/or the like. Various monuments include an aft wall that is positioned in front of a row of seats. The United States Federal Aviation Administration (the "FAA") mandates a minimum distance between a seat and an aft wall of a monument within an interior cabin of an aircraft. For example, the FAA defines a head strike zone as an area within a thirty-five inch radius from a seat reference point. Accordingly, the aft monument wall is set apart a distance that exceeds a thirty-five inch linear horizontal distance from the seat reference point.

As can be appreciated, aircraft operators seek to increase seating capacity within a limited cabin space. As seating capacity increases, revenue increases. At the same time, however, passenger safety is of utmost concern. As such, aircraft operators are limited by a minimum required distance between a row of seats and an aft wall of a monument. If a row of seats were to be positioned closer to the aft wall of the monument, FAA requirements may be violated, and passenger safety may be at risk.

SUMMARY OF THE DISCLOSURE

A need exists for a system and method of safely positioning one or more seats within a cabin of an aircraft closer to a monument, in order to increase seating capacity within the aircraft. A need exists for a system and method of safely positioning one or more seats within a cabin of an aircraft closer to a monument while also maintaining the highest possible standards of safety and complying with all relevant FAA requirements.

With those needs in mind, certain embodiments of the present disclosure provide a monument that is configured to be positioned within an internal cabin of a vehicle. The monument includes a deployable portion. The deployable portion is configured to move from a non-deployed state into a deployed state when a force that meets or exceeds a predetermined threshold is exerted into the monument.

In at least one embodiment, the deployable portion includes a deployable clearance panel within a monument wall assembly. The clearance panel is configured to move from the non-deployed state into the deployed state when the force that meets or exceeds a predetermined threshold is exerted into the monument wall assembly.

The monument may include a fixed wall. The clearance panel may include a first portion pivotally secured to the fixed wall, and a second portion coupled to the fixed wall by at least one shear pin. The shear pin(s) is configured to break upon exertion of the force that meets or exceeds the predetermined threshold. The first portion may include a lower end, and the second portion may include an upper end. In at least one other embodiment, the first portion may include an upper end, and the second portion may include a lower end.

The clearance panel may include an upper segment pivotally connected to a lower segment. In at least one other embodiment, the clearance panel is a pantographic clearance panel that is configured to move from the non-deployed state to the deployed state through pantographic motion.

The clearance panel may include a first portion that is configured to pivotally secure to a floor of the internal cabin, and a second portion that is configured to couple to one of a fixed wall or a ceiling of the internal cabin by at least one shear pin. The shear pin(s) is configured to break upon exertion of the force that meets or exceeds the predetermined threshold.

The force that meets or exceeds the predetermined threshold may be an ultimate load that is at least nine times the force of gravity.

The clearance panel may include one or more bracing members that prevent the clearance panel from moving from the deployed state back to the non-deployed state.

The monument may include a covering over the clearance panel that conceals at least a portion of the clearance panel in the non-deployed state.

The monument may also include a fixture secured thereto. The fixture provides a useful mass that facilitates movement into the deployed state when the force that meets or exceeds the predetermined threshold is exerted into the monument. In at least one embodiment, the fixture is secured to an aft surface of a clearance panel.

In at least one embodiment, the deployable portion includes a main body of the monument. The main body is configured to move from the non-deployed state into the deployed state when the force that meets or exceeds the predetermined threshold is exerted into the monument.

The main body may be configured to be secured to a portion of the internal cabin through at least one fitting including an anchored portion that connects to the main body through a frangible portion. In at least one embodiment, the main body is configured to be secured to portion of the internal cabin through at least one fitting including one or more pivot hinges. The main body may be configured to pivot forward when the force that meets or exceeds the predetermined threshold is exerted into the monument. In at least one embodiment, the monument may include one or more frangible elements located proximate to one or both of floor fittings or ceiling fittings.

Certain embodiments of the present disclosure provide a vehicle that may include an internal cabin, a plurality of seats within the internal cabin, and a monument proximate to at least one of the plurality of seats. The monument includes a deployable portion. The deployable portion is configured to move from a non-deployed state into a deployed state when a force that meets or exceeds a predetermined threshold is exerted into the monument.

Certain embodiments of the present disclosure provide a method of preventing a head strike with a monument within an internal cabin of a vehicle. The method may include moveably securing a deployable portion of the monument to a fixed wall or a fixed portion of the internal cabin, coupling the deployable portion to the fixed wall or the fixed portion of the internal cabin in a non-deployed state through one or more shear pins, breaking the shear pin(s) when a force that meets or exceeds a predetermined threshold is exerted into the monument, wherein the breaking operation is configured to occur through a harvesting of an ultimate load, and moving the deployable portion into a forward deployed state away from a passenger seat through the breaking operation. In at least one embodiment, the moving operation includes moving the deployable portion into a forward deployed state into an unoccupied or unused portion of a lavatory or a galley.

BRIEF DESCRIPTION OF THE DRAWINGS

FIG. 2A illustrates a top plan view of an internal cabin of an aircraft, according to an embodiment of the present disclosure.

FIG. 2B illustrates a top plan view of an internal cabin of an aircraft, according to an embodiment of the present disclosure.

FIG. 4 illustrates an aft exploded view of a monument wall assembly, according to an embodiment of the present disclosure.

FIG. 5 illustrates an aft view of a clearance panel coupled to a fixed wall through a shear pin, according to an embodiment of the present disclosure.

FIG. 6 illustrates an aft view of a broken shear pin between a clearance panel and a fixed wall, according to an embodiment of the present disclosure.

DETAILED DESCRIPTION OF THE DISCLOSURE

Figure 1:
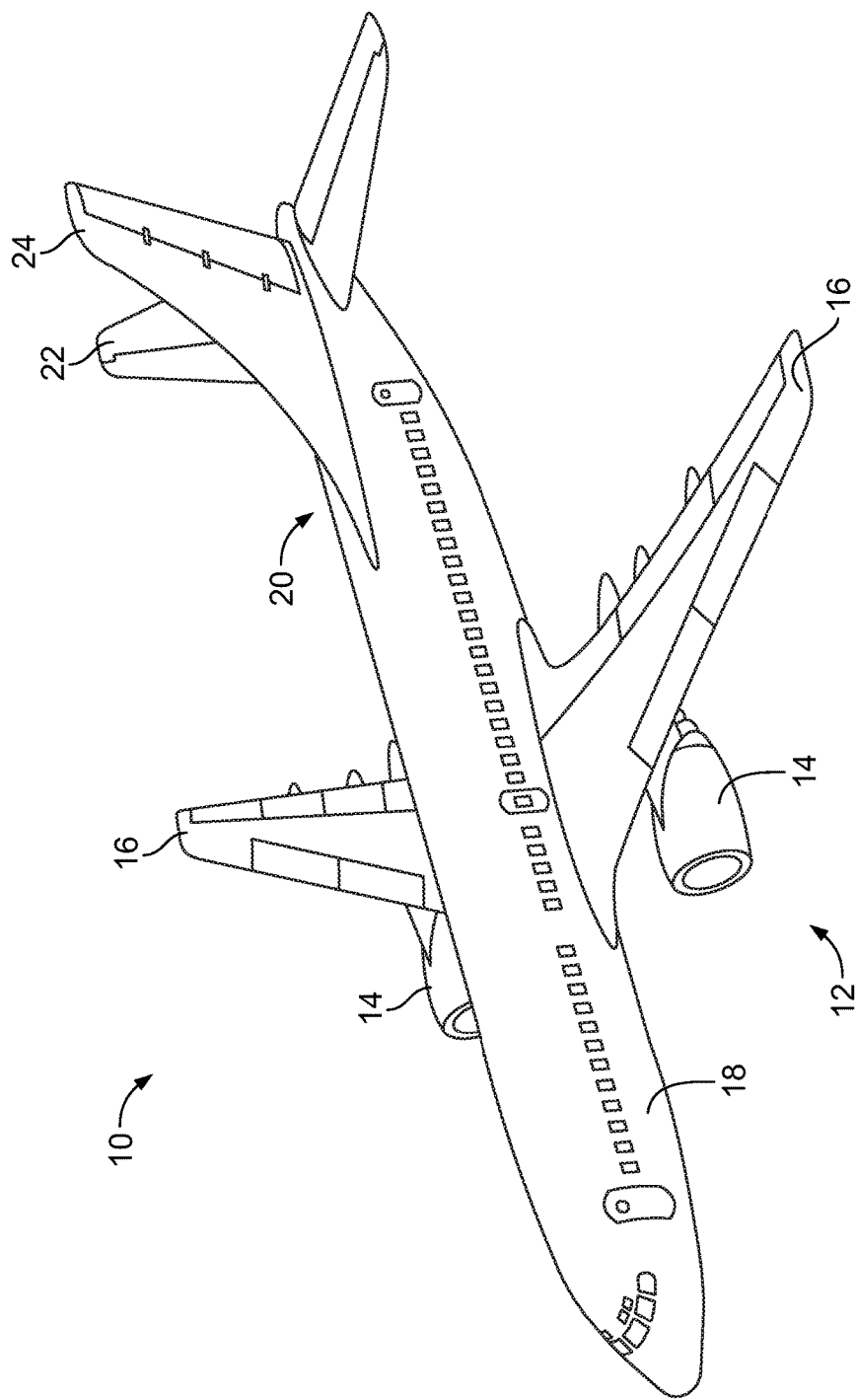
FIG. 1 illustrates a perspective top view of an aircraft, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Embodiments of the present disclosure provide a monument wall assembly that may include a deployable clearance panel that allows one or more passenger seats to be positioned closer to a monument while maintaining head injury criteria (HIC) clearance requirements, as mandated by FAA (such as Federal Aviation Regulation 25.562(c)(5)). The monument wall assembly allows for additional passenger revenue generating-seats and/or increased passenger seat pitch.

The deployable clearance panel may be installed on various portions of monuments within an internal cabin of an aircraft. The monuments may include partitions, galleys, lavatories, closets, dividing walls, and/or the like. The clearance panel is configured to deploy forward upon exertion of a forward motion or inertial load condition (that is, from aft toward fore) predetermined force, such as an ultimate load, which may exceed 16 G (that is, 16 times the force of gravity). An ultimate load is a force that causes the clearance panel to deploy (for example, move forward with respect to the monument wall). In at least one embodiment, the ultimate load is a sudden halting of a vehicle.

Certain embodiments of the present disclosure provide a monument wall assembly that may include a deployable clearance panel pivotally secured to a fixed wall, such as through one or more hinges. One or more shear pins couple the clearance panel to the fixed wall. The shear pins are configured to break upon exertion of an ultimate load into the monument wall assembly. The shear pins are configured to withstand a force that is below a predetermined threshold force (such as that caused or otherwise generated by an ultimate load). In at least one embodiment, the predetermined threshold force may be 300-400 pounds of force (which may equal the weight of the clearance panel multiplied by the exerted forward motion G force). When an ultimate load is exerted into the monument wall assembly, the weight and inertia of the clearance panels causes the shear pins to break, thereby forcing the clearance panel to deploy forward, such as by pivoting about the hinge(s). One or more bracing members (such as struts, cables, telescoping arms, and/or the like) may be used to ensure that the clearance panel remains in a fully deployed position during and after exertion of the ultimate load.

In at least one embodiment, the shear pins are configured to shear upon exertion of a predetermined ultimate load into or onto a vehicle, such as an exerted forward motion force of 16 G. As an example, if the clearance panel weighs 25 pounds, during exertion of an ultimate forward motion load ("ultimate load") of 16 G, the clearance panel deploys at 400 pounds of exerted force (16 G×25 pounds=400 pounds of forward motion force to deploy). Embodiments of the present disclosure harvest energy (for example, are configured to deploy upon exertion of the energy) generated by an ultimate load (such as 16 G of forward motion force) to deploy the clearance panel via the weight and inertia of the clearance panel. While shear pins are the mechanism of attachment/detachment described, it may also be any other mechanism such as a sensor and actuator device, or the like.

In at least one embodiment, the clearance panel may be framed within a fixed wall, and deploy forward upon exertion of the ultimate load within the internal cabin of the aircraft. In at least one embodiment, the clearance panel may be or include most of all of the monument wall itself that is pivotally secured to a portion of the aircraft, such as through one or more seat track fittings.

In a non-deployed state, the clearance panel may be hidden under a covering, such as decorative laminate (such as a tedlar laminate), wall paper, and/or the like. In this manner, the clearance panel may be non-intrusive and undetectable by passengers within an aircraft. Upon deployment, the clearance panel tears through the covering.

Embodiments of the present disclosure allow for additional passenger seating and/or increased seat pitch. Further, embodiments of the present disclosure provide simple, efficient, and reliable systems and methods of deployment during exertion of an ultimate load.

Certain embodiments of the present disclosure provide a monument configured to be secured within an interior cabin of an aircraft. The monument may include a fixed portion and a moveable portion. The moveable portion is moveable in a first position (for example, a non-deployed state) to a second position (for example, a deployed state). The second position may be forward of the first position.

Certain embodiments of the present disclosure provide a method of avoiding a head strike during exertion of an ultimate load into a vehicle. The method may include configuring a portion of a monument to be deployable or otherwise moveable such that it moves from a first static position to a second position under its own inertia by shearing of a pin upon exertion of the ultimate load.

The ultimate load may be a significant deceleration of the aircraft, in contrast to a passenger leaning up against the clearance panel, or forces caused by turbulence during flight. For example, the ultimate load may be a forward loading of the aircraft that is greater or equal to 16 G. Alternatively, the ultimate load may be greater or less than 16 G. In at least one embodiment, the ultimate load may be a forward loading of the aircraft that is greater or equal to 9 G. When the aircraft experiences a significant deceleration, such as may cause an ultimate load, part or all of the monument may controllably move to a deployed position such that additional space is provided between one or more seats and the monument to avoid contact (head strike, for example) between a passenger within one of the seats and the monument.

At least one shear pin may be incorporated into the monument. The shear pin(s) couples a frangible portion to a fixed portion of the monument. The shear pin(s) may be embedded in a portion of a honeycomb core composite sandwich panel or of another panel construction such that a well-defined portion of the panel is frangible with a frame portion of the panel still intact. Alternatively, the shear pin(s) may be in or around at least one floor or ceiling fitting such that the entire monument is able to pivot to the deployed position.

In at least one other embodiment, the monument itself is configured to move from a non-deployed state into a deployed state when a force that meets or exceeds a predetermined threshold is exerted into the monument. For example, the monument may pivot forward about floor or ceiling fittings within an internal cabin of an aircraft when the force that meets or exceeds the predetermined threshold is exerted into the monument. Frangible elements (such as shear pins(s)) may be located at extremities of the monument, such as proximate or at floor fittings or ceiling fittings.

Additionally, a fixture may be secured to the monument. The fixture (for example, an inflight entertainment system, literature rack, storage cabinet, changing table for infants, and/or the like) provides a useful mass that ensures that the frangible elements release (for example, break) when the force that meets or exceeds the predetermined threshold is exerted into the monument, and not under normal operating loads. Further, a mechanical advantage device (such as a lever) may be employed to define a release point.

The monument may include a fixed portion and a moveable portion. The fixed portion may be feet, anchors, frame portions, and/or the like that are secured to a portion of the internal cabin, such as seat and/or ceiling fittings. The moveable portion may be or include a main body of the monument. The moveable portion is configured to move from a first position to a second position when a force that meets or exceeds the predetermined threshold is exerted into the monument. In at least one embodiment, the second position is forward of the first position.

Embodiments of the present disclosure provide improved safety aboard a vehicle, better space utilization within an internal cabin of the vehicle, and a lightweight, simple, cost-effective, aesthetically unobtrusive, maintenance-free system and assembly.

FIG. 1 illustrates a perspective top view of a vehicle, such as an aircraft 10 (or aircraft assembly), according to an embodiment of the present disclosure. The aircraft 10 may include a propulsion system 12 that may include two turbofan engines 14, for example. Optionally, the propulsion system 12 may include more or less engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an internal cabin, which may include a cockpit, one or more work sections (for example, galleys, personnel carry-on baggage areas, and the like), one or more passenger sections (for example, first class, business class, and economy class sections), and an aft section in which an aft rest area assembly may be positioned. Each of the sections may be separated by a cabin transition area, which may include one or more monuments, such as galleys, lavatories, closets, partitions, class divider assemblies, and/or the like.

As explained below, the aircraft 10 may include one or more monuments proximate to passenger seats that may include a fixed portion (such as a fixed wall), and a moveable portion (such as a deployable clearance panel) that is configured to deploy forward in the event of an ultimate load exerted into the aircraft, such as a significant deceleration (for example, a sudden and immediate halting) of the aircraft that equals or exceeds 16 G, for example. Alternatively, the ultimate load may be greater or lesser than 16 G.

Alternatively, instead of an aircraft, embodiments of the present disclosure may be used with various other vehicles, such as automobiles, buses, locomotives and train cars, watercraft, spacecraft, and the like.

FIG. 2A illustrates a top plan view of an internal cabin 30 of an aircraft, according to an embodiment of the present disclosure. The internal cabin 30 may be within a fuselage 32 of the aircraft. For example, one or more fuselage walls may define the internal cabin 30. The internal cabin 30 includes multiple sections, including a front section 33, a first class section 34 (or first class suites, cabins, for example), a business class section 36, a front galley station 38 that includes a monument such as a galley, an expanded economy or coach section 40, a standard economy or coach section 42, and an aft section 44, which may include monuments such as lavatories and galleys. It is to be understood that the internal cabin 30 may include more or less sections than shown. For example, the internal cabin 30 may not include a first class section, and may include more or less galley stations than shown. Each of the sections may be separated by a cabin transition area 46, which may include monuments such as class divider assemblies between aisles 48.

As shown in FIG. 2A, the internal cabin 30 includes two aisles 50 and 52 that lead to the aft section 44. Optionally, the internal cabin 30 may have less or more aisles than shown. For example, the internal cabin 30 may include a single aisle that extends through the center of the internal cabin 30 that leads to the aft section 44.

The internal cabin 30 includes numerous monuments. For example, the internal cabin 30 includes lavatories 60, galleys 62, closets or partitions 64, and the like.

FIG. 2B illustrates a top plan view of an internal cabin 80 of an aircraft, according to an embodiment of the present disclosure. The internal cabin 80 may be within a fuselage 81 of the aircraft. For example, one or more fuselage walls may define the internal cabin 80. The internal cabin 80 includes multiple sections, including a cockpit 89, a main cabin 82 having passenger seats 83, and an aft section 85 behind the main cabin 82. It is to be understood that the internal cabin 80 may include more or less sections than shown.

The internal cabin 80 may include a single aisle 84 that leads to the aft section 85. The single aisle 84 may extend through the center of the internal cabin 80 that leads to the aft section 85. For example, the single aisle 84 may be coaxially aligned with a central longitudinal plane of the internal cabin 80.

Figure 3:
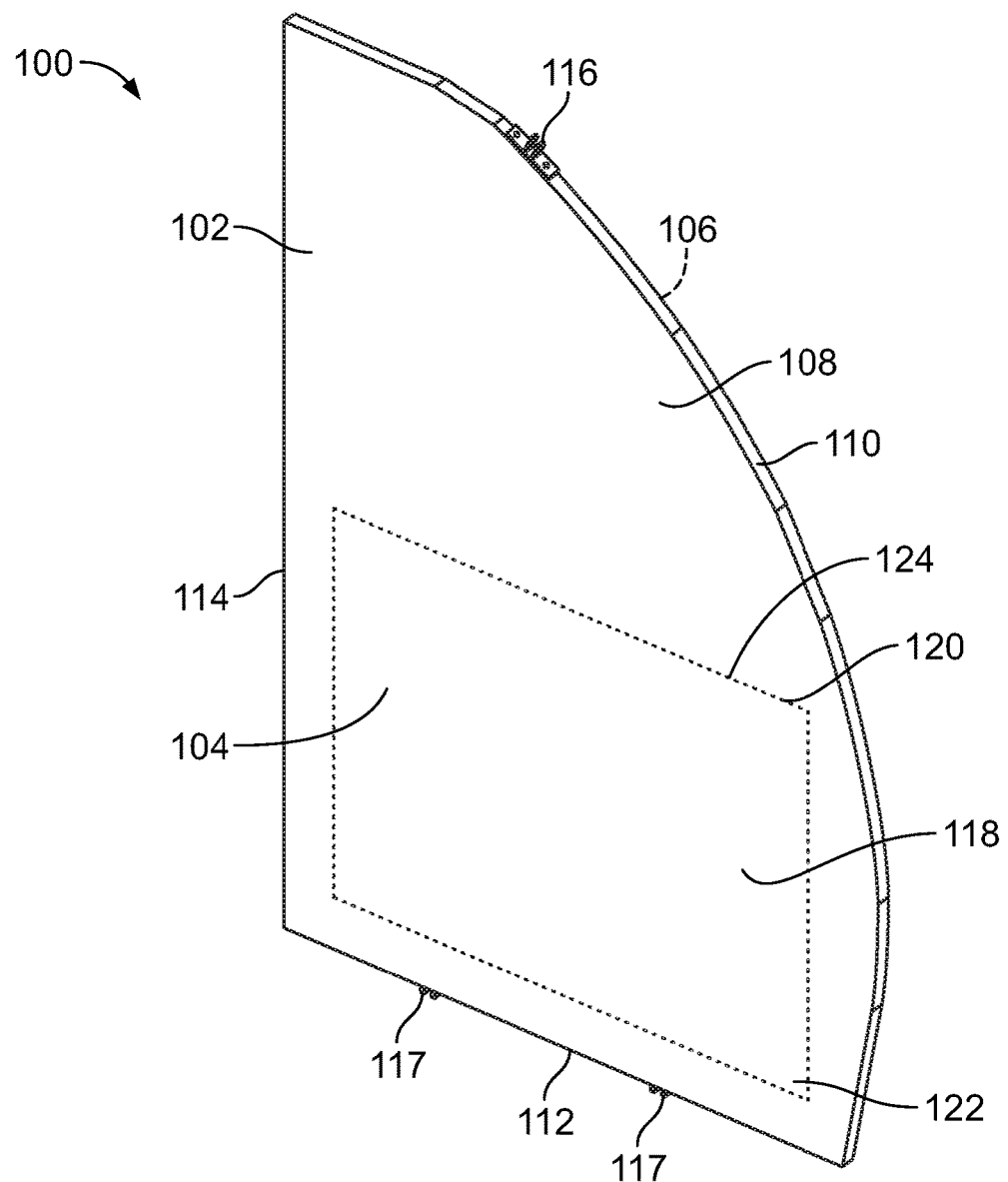
FIG. 3 illustrates a perspective aft view of a monument wall assembly, according to an embodiment of the present disclosure.

FIG. 3 illustrates a perspective aft view of a monument wall assembly 100, according to an embodiment of the present disclosure. The monument wall assembly 100 may include a fixed portion, such as a fixed wall 102, and a moveable portion, such as a deployable clearance panel 104, that is coupled to the fixed wall 102.

The fixed wall 102 includes a fore surface 106 connected to an opposite aft surface 108 through an outboard edge 110, a base edge 112, and an inboard edge 114. The outboard edge 110 is configured to securely mount to an internal portion of a fuselage of an aircraft, for example, such as through one or more securing members 116 (for example, brackets, fasteners, fittings, and/or the like). The base edge 112 is configured to securely connect to a floor within an internal cabin of the aircraft such as through one or more securing members 117 (for example, fittings configured to securely connect to seat tracks, hard points, brackets, fasteners, and/or the like). The inboard edge 114 may be an edge surface that is exposed proximate to an aisle of the internal cabin of the aircraft.

The clearance panel 104 includes an aft surface 118 that is configured to face one or more seats within the internal cabin. Upon exertion of an ultimate load in the generally forward direction on the clearance panel 104 (such as caused by a significant deceleration of an aircraft), the weight or mass and inertia of the clearance panel 104 causes it to deploy forward away from the seat(s) within the internal cabin, thereby providing sufficient head injury criteria (HIC) clearance, as defined by the FAA.

A coveting 120 may be positioned at a transition area between the clearance panel 104 and the fixed wall 102. The covering 120 may be a laminate, wall paper, paint, and/or the like that conceals that clearance panel 104 while in a static, non-deployed state.

The clearance panel 104 may be pivotally secured to the fixed wall 102 at a lower end 122. For example, a hinge, a shaft, rotation pins, or the like (hidden from view in FIG. 3) may pivotally couple the clearance panel 104 to the fixed wall 102 at the lower end 122.

One or more release devices, such as shear pins (hidden from view in FIG. 3), may couple the clearance panel 104 to the fixed wall at an upper end 124. The release device may be any mechanism of structural attachment and detachment configured to actuate at a predetermined threshold of force or acceleration, for example. In at least one embodiment, an accelerometer may be used as a sensor to signal an actuator mechanism. In at least one other embodiment, the release devices may be shear pins that are configured to release (for example, shear and break) upon exertion of a predetermined force, such as an ultimate forward motion force. The ultimate force causes the shear pins to break due to the weight or mass and inertia of the clearance panel 104.

In at least one embodiment, the clearance panel 104 may be secured within an opening formed through the fixed wall 102, and directly connected to the fixed wall 102, such as through one or more hinges, the shear pins, bracing supports, and/or the like. In at least one other embodiment, the clearance panel 104 may include a frame that surrounds a main body of the clearance panel 104. The main body may be coupled to the frame through one or more hinges, the shear pins, bracing supports, and/or the like. The frame may be mounted within an opening of the fixed wall 102.

As shown in FIG. 3, the clearance panel 104 is in the non-deployed state. In the non-deployed state, the aft surface 118 of the clearance panel 104 may generally be flush with the aft surface 108 of the fixed wall 102. In this manner, the aft surface of the monument wall assembly 100 (including the aft surfaces 108 and 118) may reside in a single common plane when the clearance panel 104 is in the non-deployed state.

FIG. 4 illustrates an aft exploded view of the monument wall assembly 100. The fixed wall 102 may define an internal opening 126 into which the clearance panel 104 is positioned. Brackets 128 extend upwardly from the upper end 124 of the clearance panel 104. Each bracket 128 may include outer retainers 130 that are configured to retain outer ends 132 of a shear pin 134. The brackets 128 are configured to mate with reciprocal brackets 136 formed within an upper internal edge 138 of the fixed wall 102 that defines an upper portion of the internal opening 126. Each bracket 136 may include a central retainer 140 extending between opposite channels 142. The opposite channels 142 are configured to receive the outer retainers 130 of the brackets 128, while the central retainers 140 are configured to retain central bodies 144 of the shear pins 134 that connect the outer ends 132 together. Optionally, the brackets 128 may include a central retainer, while the brackets 136 include outer retainers. In other embodiments, the shear pins may shear, or break, in a single location when a threshold force, or load, is imparted on the clearance panel. In other embodiments, the shear pin can protrude from the clearance panel into the fixed wall or vice-versa, e.g. a spring-loaded pin, or the like.

FIG. 5 illustrates an aft view of the clearance panel 104 coupled to the fixed wall 102 through the shear pin 134. In a non-deployed state, the upper end 124 of the clearance panel 104 connects to the fixed wall 102 through the contiguous shear pin 134, which is unbroken. The shear pin 134 may be installed into the clearance panel 104 via a side access hole, for example.

FIG. 6 illustrates an aft view of a broken shear pin 134 between the clearance panel 104 and the fixed wall 102. When the monument wall assembly 100 is subjected to a force that meets or exceeds a predetermined threshold (such as a force of the ultimate load), the weight and inertia of the clearance panel 104 exerts sufficient force into the shear pin(s) 134 to break the outer portions 132 from the central body at reduced diameter neck portions 146.

Referring to FIGS. 4-6, each shear pin 134 is configured to withstand a predetermined load before breaking. For example, each shear pin 134 may be configured to withstand a threshold load of 300 pounds of force. As an exerted load on the shear pin 134 exceeds 300 pounds of force, the shear pin 134 breaks, as shown in FIG. 6. Optionally, the threshold load may be greater or less than 300 pounds of force. For example, the threshold load may be 400 pounds of force. In this manner, the shear pins 134 remain intact and unbroken if a passenger merely leans up against the clearance panel 104.

When the monument wall assembly 100 is subjected to an ultimate load (such as exerted during a sudden deceleration of an aircraft), the weight and inertia of the clearance panel 104 causes the shear pins 134 to break and the clearance panel 104 to pivot forward with respect to the fixed wall 102. As just one non-limiting example, the ultimate load may be predetermined to be 16 G, and the clearance panel may weigh 25 pounds. In this example, the force exerted into the shear pins 134 is 400 pounds of force (16 G×25 pounds=400 pounds), which may be the threshold force that causes the shear pins 134 to break, as shown in FIG. 6.

The shear pins 134 are designed to shear or otherwise break in the case of a mechanical overload (for example, when the monument wall assembly 100 is subjected to an ultimate load). The shear pins 134 are sacrificial, and may be considered mechanical fuses. Each shear pin 134 may be formed of metal, plastic, and/or the like.

As shown in FIG. 4, the clearance panel 104 may couple to the fixed wall 102 in a non-deployed state through two shear pins 134. Alternatively, more or less shear pins 134 may be used. For example, in the non-deployed state, the clearance panel 104 may couple to the fixed wall 102 through a single shear pin 134. In at least one other embodiment, in the non-deployed state, the clearance panel 104 may couple to the fixed wall 102 through three or more shear pins 134. In other embodiments, the shear pins may shear, or break, in a single location when a threshold force, or load, is imparted on the clearance panel. In other embodiments, the shear pin can protrude from the clearance panel into the fixed wall or vice-versa, e.g. a spring-loaded pin, or the like in a direction generally normal to the edge surface of the clearance panel.

Figure 7:
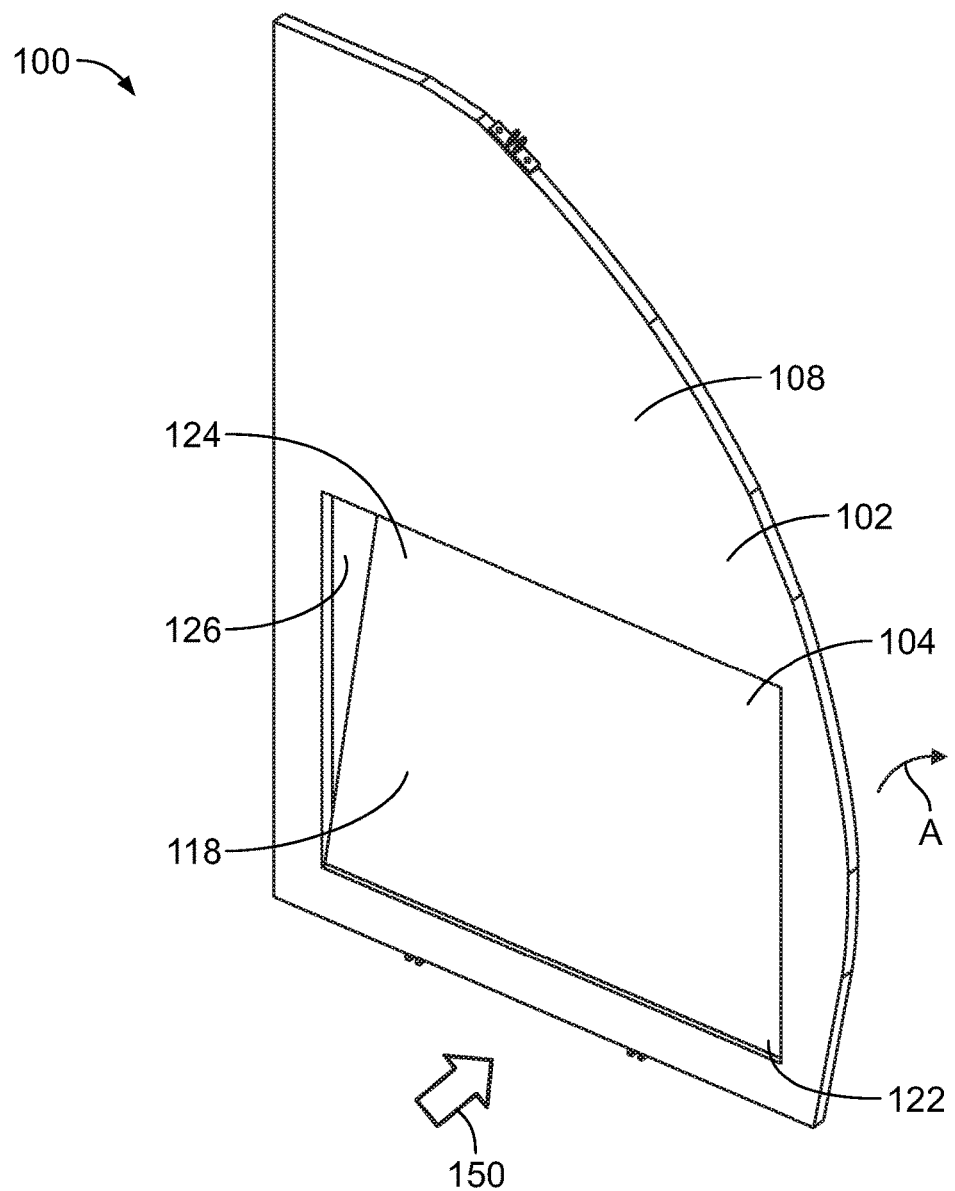
FIG. 7 illustrates a perspective aft view of a monument wall assembly with a clearance panel in a deployed state, according to an embodiment of the present disclosure.
Figure 8:
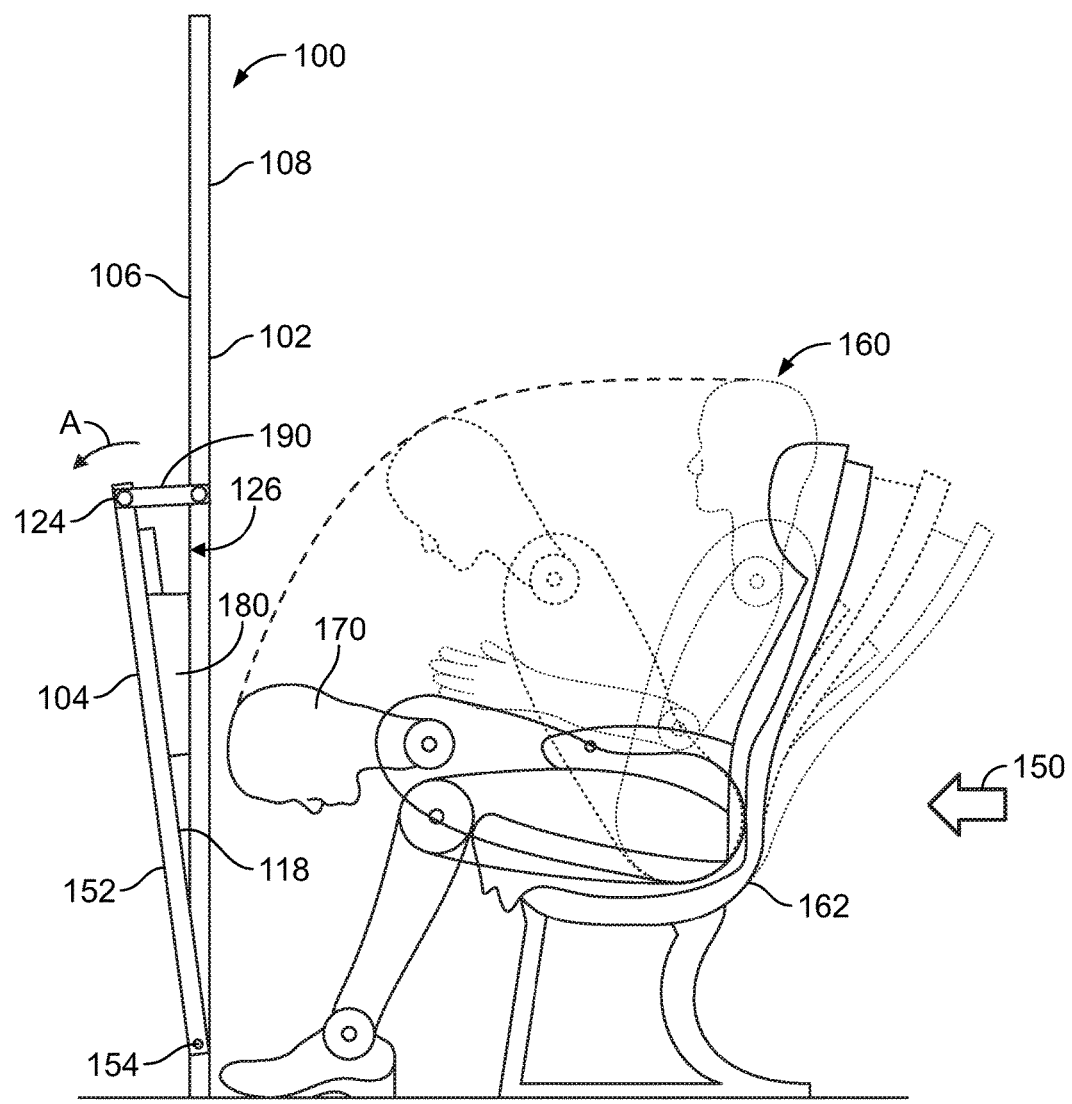
FIG. 8 illustrates a lateral view of a monument wall assembly with a clearance panel in a deployed state, according to an embodiment of the present disclosure.

FIG. 7 illustrates a perspective aft view of the monument wall assembly 100 with the clearance panel 104 in a deployed state. FIG. 8 illustrates a lateral view of the monument wall assembly 100 with the clearance panel 104 in the deployed state. Referring to FIGS. 7 and 8, as the monument wall 100 is subjected to the ultimate load 150, which is directed towards and into the aft surface 118 of the clearance panel 104 towards a fore surface 152, the weight and inertia of the clearance panel 104 causes the shear pins 134 (shown in FIGS. 4-6) to break, thereby causing the clearance panel 104 to pivot forward in the direction of arc A about an axis 154 (such as an axis defined by one or more hinges, axles, and/or the like) that pivotally connects the clearance panel 104 to the fixed wall 102. Accordingly, the upper end 124 swings forward, thereby providing additional head clearance area for a passenger 160 seated within a seat 162 that faces the aft surface 118 of the clearance panel 104. During deployment, any covering (such as the covering 120 shown in FIG. 3) is torn proximate the interface between the clearance panel 104 and the fixed wall 102. Therefore, the seat 162 may be positioned closer to the monument wall assembly 100 as sufficient HIC clearance area exists as the clearance panel 104 forwardly deploys in relation to the fixed wall 102.

As shown, as the ultimate load 150 is experienced, the head 170 of the passenger 160 may swing forward. Because the clearance panel 104 forwardly deploys at the same time, the passenger 160 is not at risk of striking his/her head against any portion of the monument wall assembly 100.

A fixture 180 may be secured to and outwardly extend from the aft surface 118 and/or lateral surfaces of the clearance panel 104. The fixture 180 may be a literature pocket, a storage box, a monitor, and/or the like. Optionally, the clearance panel 104 may not include the fixture 180. The fixture 180 adds weight to the clearance panel 104. Accordingly, the weight of the fixture 180 may facilitate easier and smoother deployment of the clearance panel upon exertion of the ultimate load 150.

Additionally, bracing members 190 may pivotally and/or slidably couple the upper end 124 of the clearance panel 104 to the fixed wall 102. As the clearance panel 104 deploys, the bracing members 190 pivot and/or slide into an outwardly deployed position that prevents the clearance panel 104 from pivoting back about the axis 154 in a direction opposite of arc A. The bracing members 190 may be struts, cables, telescoping members, energy-absorption devices, and/or the like. The bracing members 190 may be secured to outer lateral edges of the clearance panel 104. One or more bracing members 190 may be used.

The monument wall assembly 100 is configured to harvest ultimate load energy to deploy the clearance panel 104. For example, the monument wall 100 deploys upon exertion of the ultimate load energy into a vehicle that includes the monument wall assembly 100. The monument wall assembly 100 may be part of various monuments, such as an aft portion of a lavatory, a galley that stores carts, a divider wall, a class transition wall, a closet, and/or the like.

Figure 9:
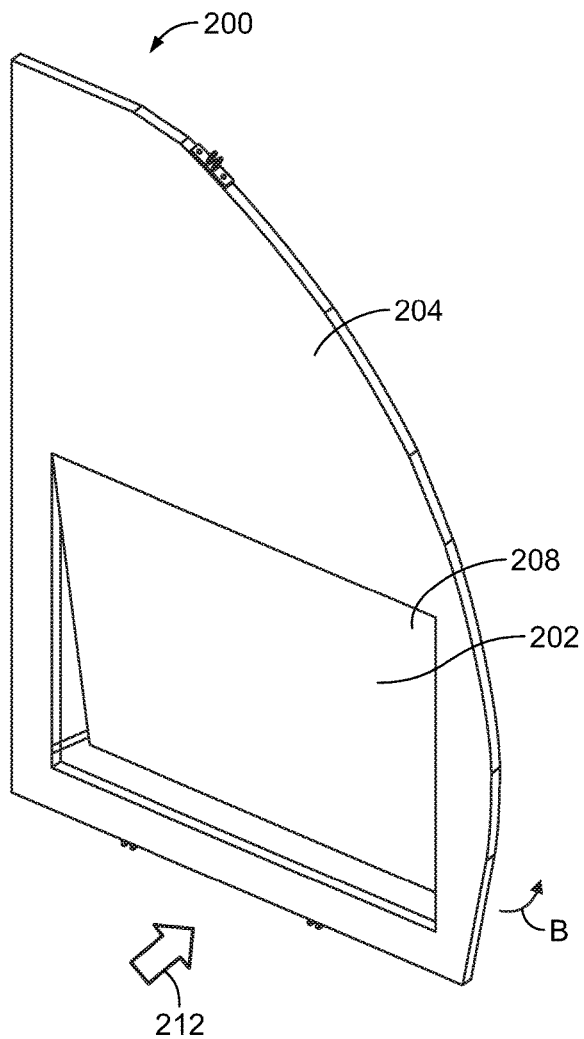
FIG. 9 illustrates a perspective aft view of a monument wall assembly with a clearance panel in a deployed state, according to an embodiment of the present disclosure.
Figure 10:
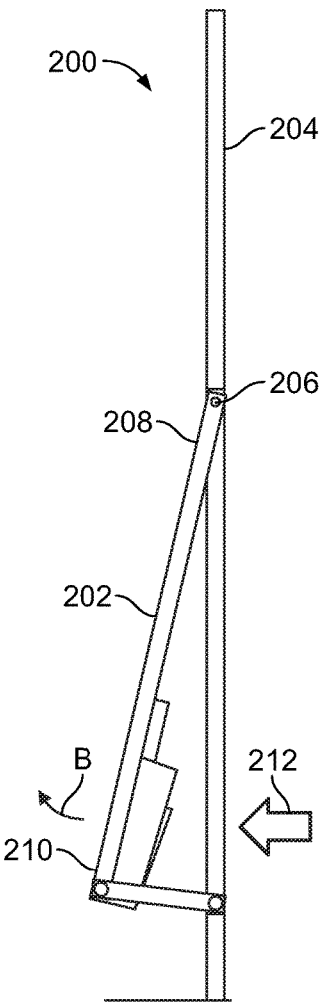
FIG. 10 illustrates a lateral view of a monument wall assembly with a clearance panel in a deployed state, according to an embodiment of the present disclosure.

FIG. 9 illustrates a perspective aft view of a monument wall assembly 200 with a clearance panel 202 in a deployed state, according to an embodiment of the present disclosure. FIG. 10 illustrates a lateral view of the monument wall assembly 200 with the clearance panel 202 in the deployed state. Referring to FIGS. 9 and 10, the monument wall assembly 200 is similar to the monument wall assembly 100, except that the clearance panel 202 pivots open into a deployed state with respect to a fixed wall 204 about an axis 206 at an upper end 208, instead of a lower end 210. When an ultimate load 212 is exerted into the monument wall assembly 200, the lower end 210 swings open in the direction of arc B, as the clearance panel 202 pivots open about the axis 206.

Figure 11:
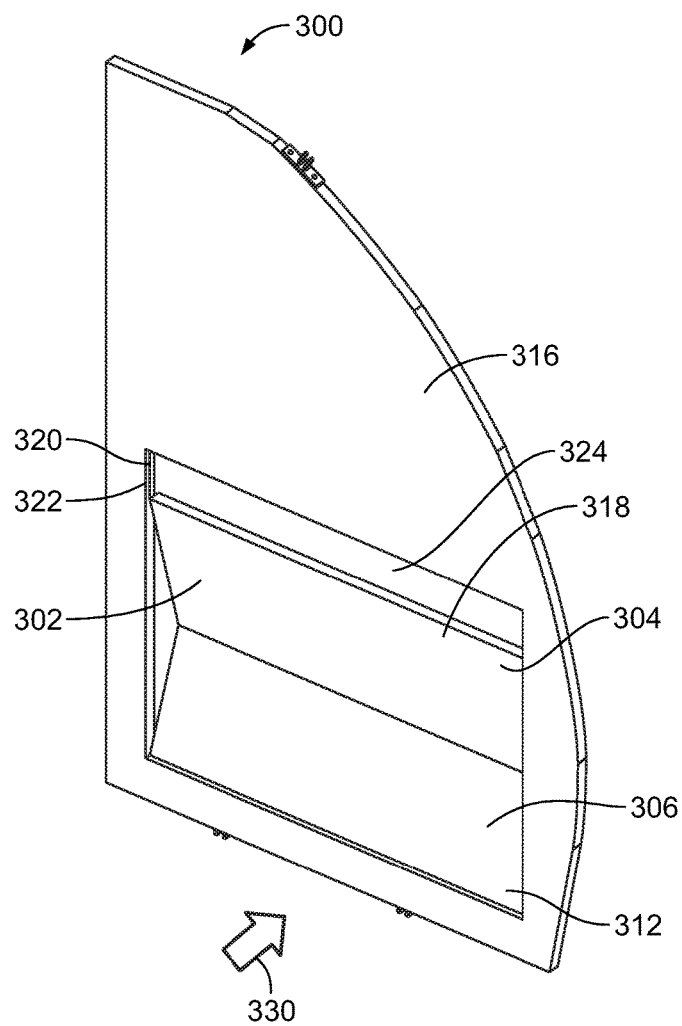
FIG. 11 illustrates a perspective aft view of a monument wall assembly with a clearance panel in a deployed state, according to an embodiment of the present disclosure.
Figure 12:
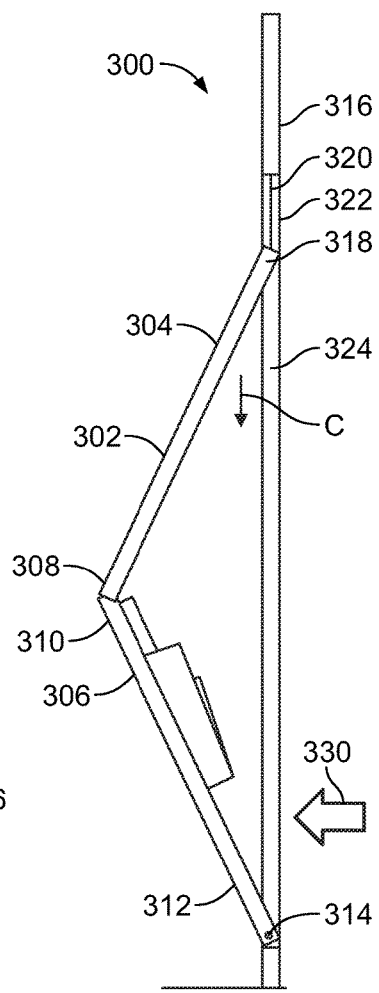
FIG. 12 illustrates a lateral view of a monument wall assembly with a clearance panel in a deployed state, according to an embodiment of the present disclosure.

FIG. 11 illustrates a perspective aft view of a monument wall assembly 300 with a clearance panel 302 in a deployed state, according to an embodiment of the present disclosure. FIG. 12 illustrates a lateral view of the monument wall assembly 300 with a clearance panel 302 in a deployed state. Referring to FIGS. 11 and 12, the monument wall assembly 300 is similar to the monument assembly 100, except that the clearance panel 302 includes an upper segment 304 pivotally connected to a lower segment 306 at respective proximal ends 308 and 310. The clearance panel 302 may include two panels, such as the segments 304 and 306, that are pivotally connected to one another. A lower end 312 of the lower segment 306 is pivotally secured to a fixed wall 316 through an axis 314. An upper end 318 is slidably retained within tracks 320 formed through internal edges 322 that define an opening 324 through the fixed wall 316, such as through bearings. When an ultimate load 330 is exerted into the monument wall assembly 300, the upper and lower segments 304 and 306 pivot forward about the pivotal interface therebetween, as the lower segment 306 pivots forward about the axis 314 and the upper end 318 of the upper segment 304 slides downwardly in the direction of arrow C and upper segment 304 also pivots about an axis at upper end 318.

Figure 13:
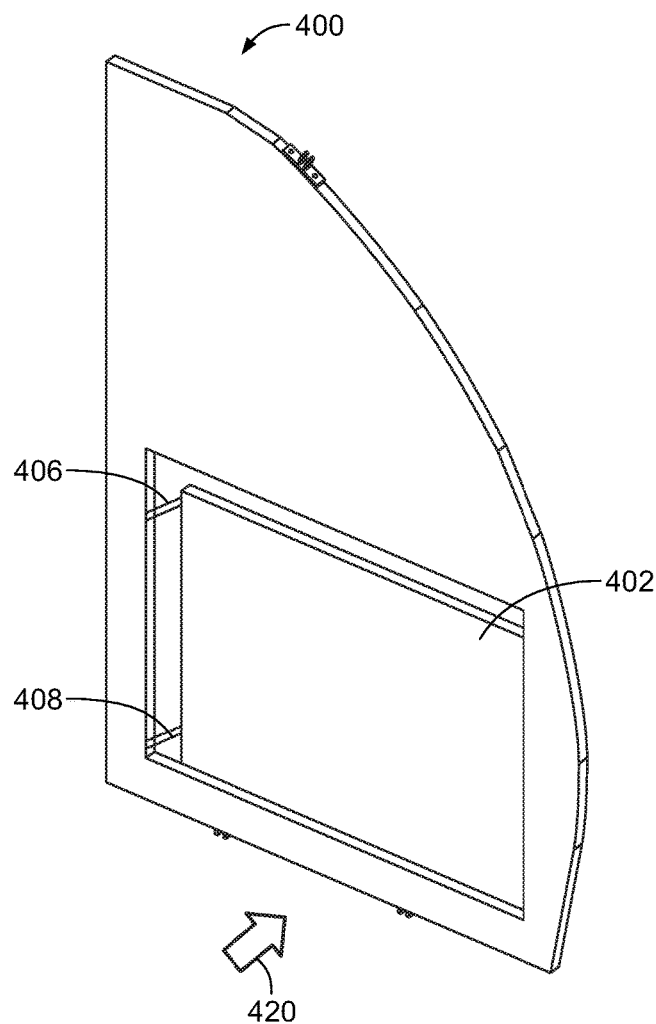
FIG. 13 illustrates a perspective aft view of a monument wall assembly with a clearance panel in a deployed state, according to an embodiment of the present disclosure.
Figure 14:
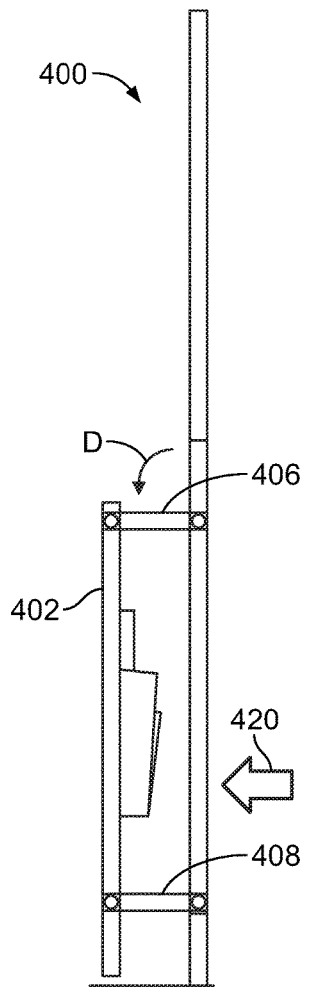
FIG. 14 illustrates a lateral view of a monument wall assembly with a clearance panel in a deployed state, according to an embodiment of the present disclosure.

FIG. 13 illustrates a perspective aft view of a monument wall assembly 400 with a clearance panel 402 in a deployed state, according to an embodiment of the present disclosure. FIG. 14 illustrates a lateral view of the monument wall assembly 400 with the clearance panel 402 in the deployed state. Referring to FIGS. 13 and 14, the monument wall assembly 400 is similar to the monument wall assembly 100, except that the monument wall assembly 400 includes the pantographic clearance panel 402, that swings forward and downward via pantographic motion into a deployed state about upper and lower bracing members 406 and 408 in the direction of arc D upon exertion of an ultimate load 420 into the monument wall assembly 400. The bracing members 406 and 408 may be the same length or different lengths. The term pantographic configuration may include upper and lower linkages of the same or similar length. In at least one other embodiment, the pantographic configuration may include linkages having different lengths.

Figure 15:
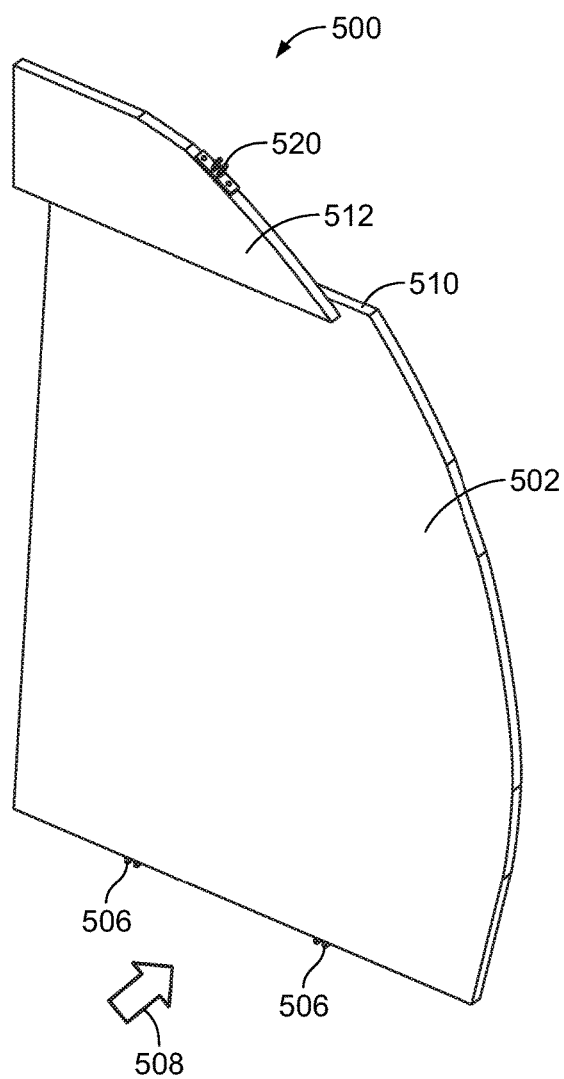
FIG. 15 illustrates a perspective aft view of a monument wall assembly with a clearance panel in a deployed state, according to an embodiment of the present disclosure.
Figure 16:
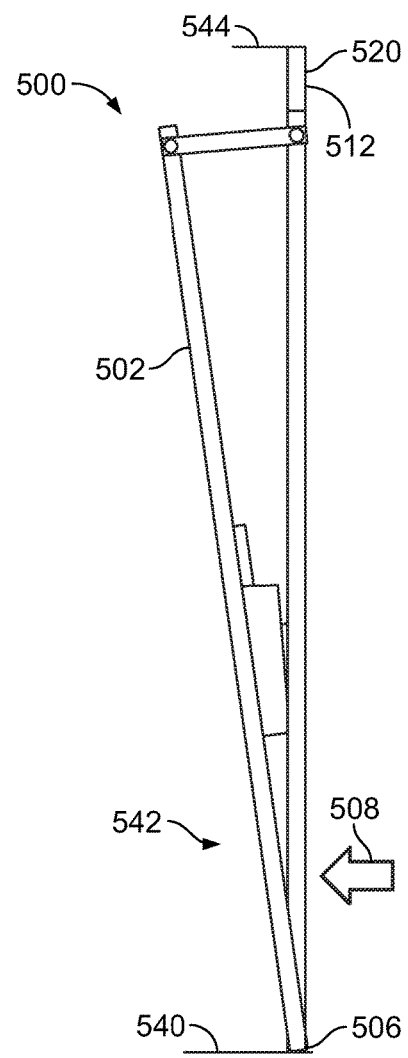
FIG. 16 illustrates a lateral view of a monument wall assembly with a clearance panel in a deployed state, according to an embodiment of the present disclosure.

FIG. 15 illustrates a perspective aft view of a monument wall assembly 500 with a clearance panel 502 in a deployed state, according to an embodiment of the present disclosure. FIG. 16 illustrates a lateral view of the monument wall assembly 500 with the clearance panel 502 in the deployed state. Referring to FIGS. 15 and 16, the monument wall assembly 500 is similar to the monument wall assembly 100, except that the clearance panel 502 is pivotally secured to fittings 506 that secure the monument wall assembly 500 to a floor of an internal cabin, such as through seat tracks. The fittings 506 allow the clearance panel 502 to pivotally deflect forward when an ultimate load 508 is exerted into the monument wall assembly 500. An upper end 510 of the clearance panel 502 couples to a fixed wall 512 in a non-deployed state through one or more shear pins, as described above. The fixed wall 512 may be a fixed header that securely connects to a ceiling within an internal cabin through one or more securing members 520. As shown in FIGS. 15 and 16, the clearance panel 502 may account for substantially greater than half the height of the monument wall assembly 500. Optionally, the clearance panel 502 may be shorter or longer than shown in FIGS. 15 and 16. For example, in at least one embodiment, the clearance panel 502 may be the entire height of the monument wall assembly 500 and removably connect to a ceiling within an internal cabin through one or more shear pins (instead of connecting to a separate and distinct fixed wall portion).

The clearance panel 502 pivotally secures to a floor 540 of an internal cabin 542, such as through the fittings 506. The clearance panel 502 also couples to the fixed wall 512 or a ceiling 544 of the internal cabin 542 with at least one shear pin, as described above. The shear pin(s) is configured to break upon exertion of a force that meets or exceeds a predetermined threshold, such as an ultimate load exerted into the monument wall assembly 500.

Figure 17A:
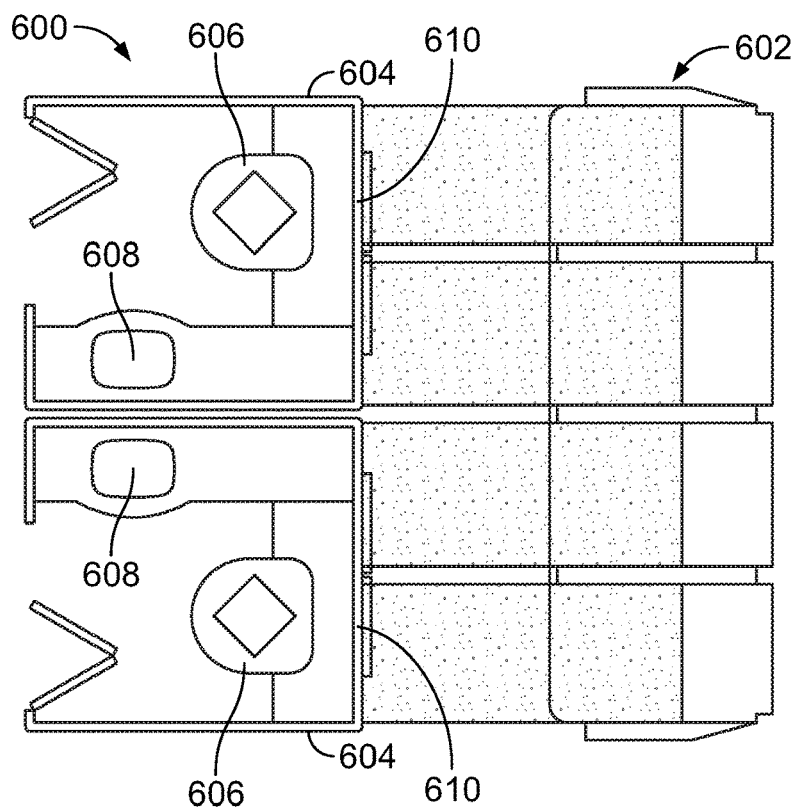
FIG. 17A illustrates a top plan view of a portion of an internal cabin of an aircraft, according to an embodiment of the present disclosure.

FIG. 17A illustrates a top plan view of a portion of an internal cabin 600 of an aircraft, according to an embodiment of the present disclosure. The internal cabin 600 includes a row of seats 602 behind monuments 604. Each of the monuments 604 may be a lavatory including a toilet 606 and a sink 608. The monuments 604 are separated from the row of seats 602 by a monument wall assembly 610. The monument wall assembly 610 may be any of the monument wall assemblies described above with respect to FIGS. 3-16.

Figure 17B:
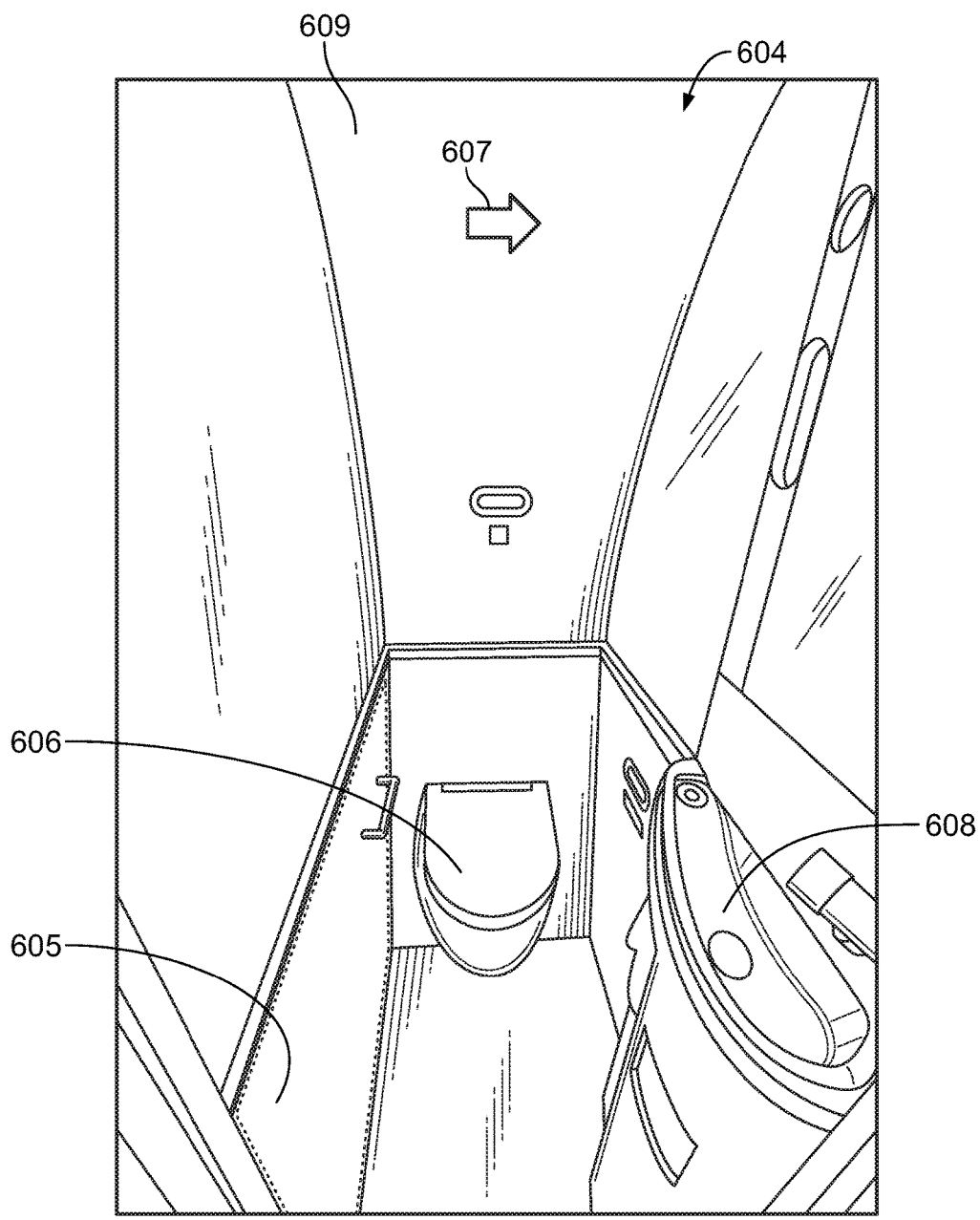
FIG. 17B illustrates a perspective internal view of a lavatory having a clearance panel in secure, non-deployed state, according to an embodiment of the present disclosure.
Figure 17C:
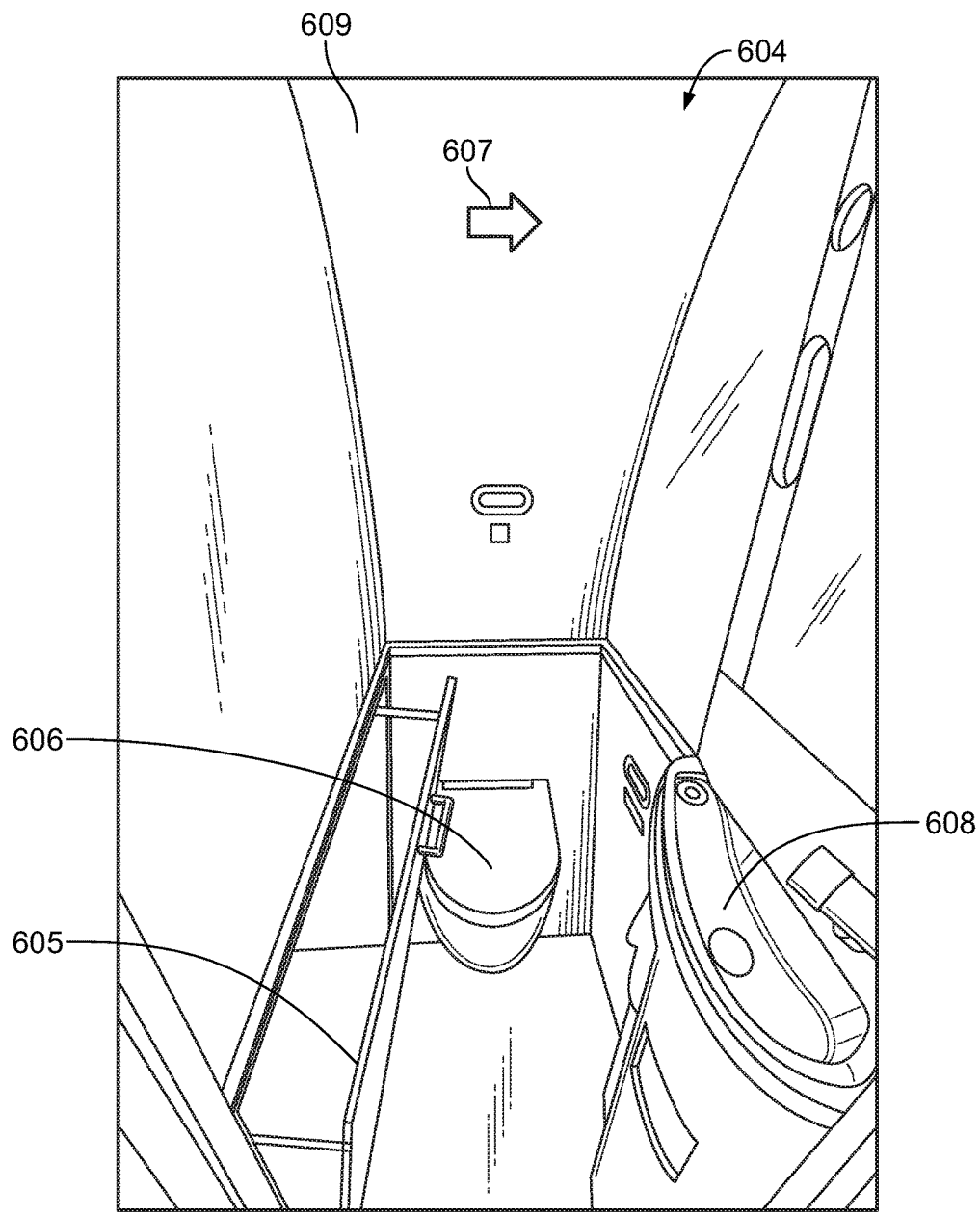
FIG. 17C illustrates a perspective internal view of a lavatory having a clearance panel in deployed state, according to an embodiment of the present disclosure.

FIG. 17B illustrates a perspective internal view of a lavatory 604 having a clearance panel 605 in secure, non-deployed state, according to an embodiment of the present disclosure. FIG. 17C illustrates a perspective internal view of a lavatory having a clearance panel 605 in deployed state, according to an embodiment of the present disclosure. Referring to FIGS. 17B and 17C, upon exertion of an ultimate load 607 directed from an aft section toward a forward section, the clearance panel 605 deploys into an interior space 609 of the lavatory 604. As shown, the toilet 606 may be adjacent or otherwise proximate to the monument wall assembly 610. However, the toilet 606 and sink 608 may be located at various other portions of the interior space 609.

As shown in FIGS. 17B-17C, the clearance panel 605 may be deployed into an unoccupied lavatory 604. The lavatory 604 is unoccupied during aircraft taxi, take-off, and landing, when an ultimate load may be exerted into the aircraft.

Figure 18:
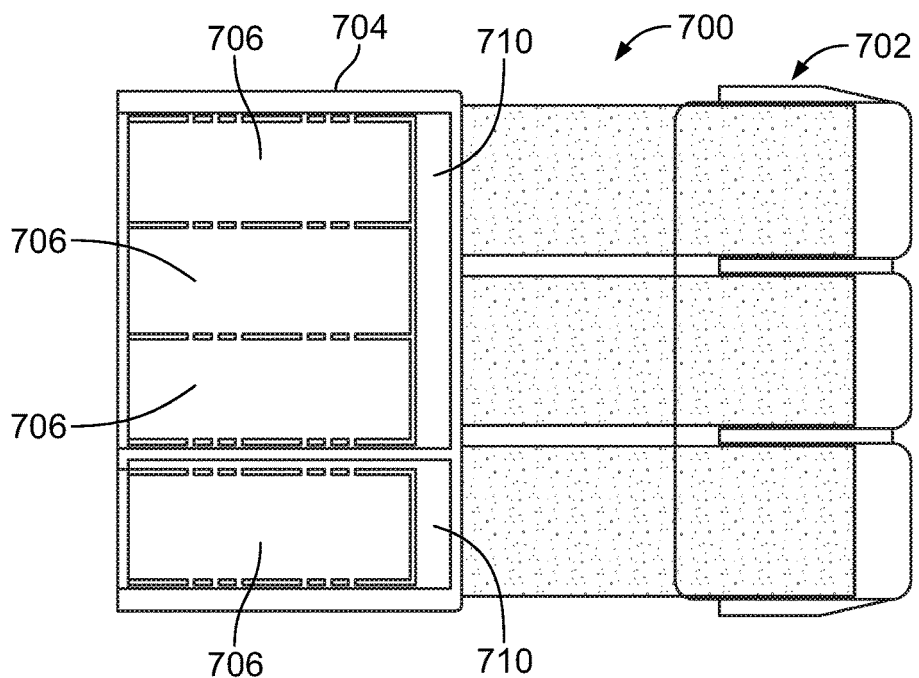
FIG. 18 illustrates a top plan view of a portion of an internal cabin of an aircraft, according to an embodiment of the present disclosure.

FIG. 18 illustrates a top plan view of a portion of an internal cabin 700 of an aircraft, according to an embodiment of the present disclosure. The internal cabin 700 includes a row of seats 702 behind a monument 704. The monument 704 may be a galley including bays 706 configured to receive food and beverage carts. The monument 704 is separated from the row of seats 702 by a monument wall assembly 710. The monument wall assembly 710 may be any of the monument wall assemblies described above with respect to FIGS. 3-16. A clearance panel of a monument wall assembly 710 may be deployed into an unused void within the galley.

Figure 19:
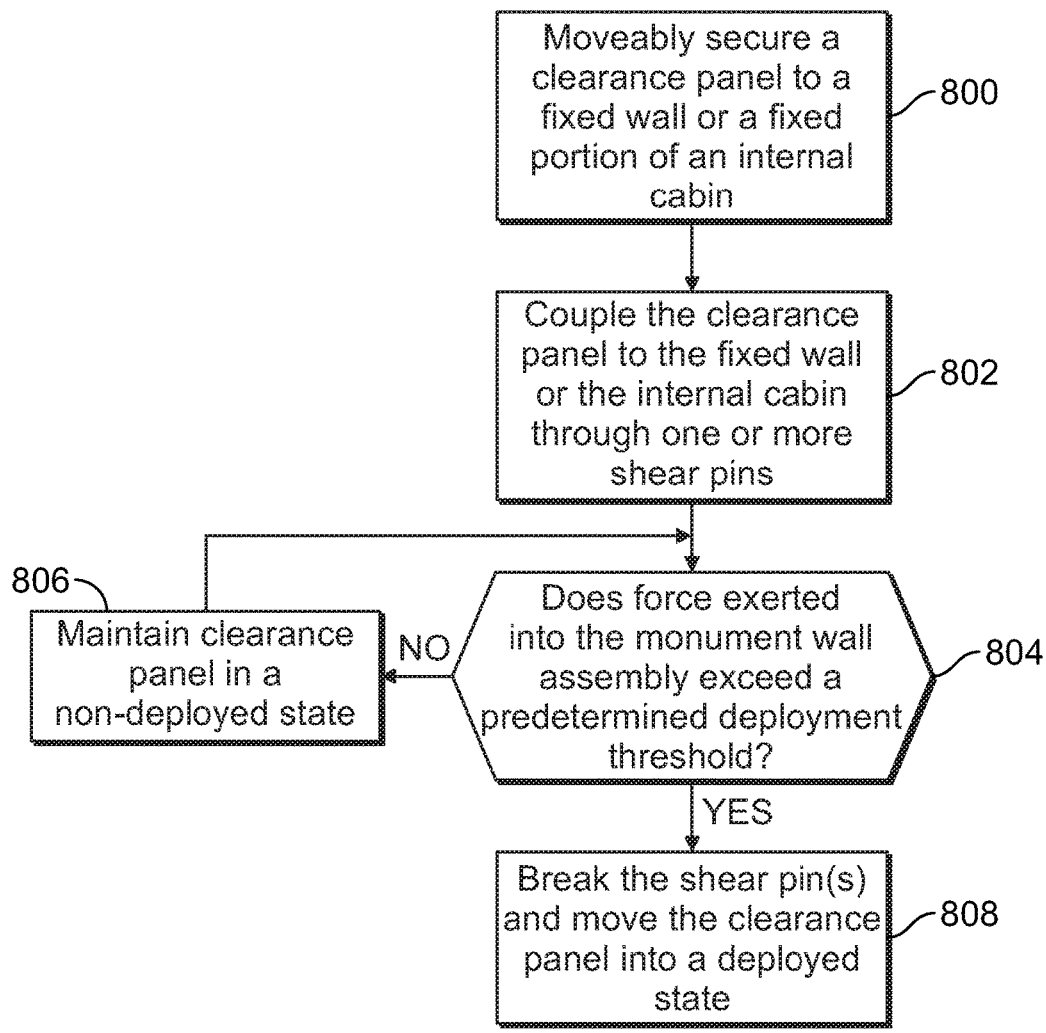
FIG. 19 illustrates a flow chart of a method of operating an monument wall assembly so as to allow a row of seats to be positioned closer thereto, according to an embodiment of the present disclosure.

FIG. 19 illustrates a flow chart of a method of operating a monument wall assembly so as to allow a row of seats to be positioned closer thereto, according to an embodiment of the present disclosure. The method begins at 800, in which a clearance panel is moveably secured to a fixed wall or a fixed portion of an internal cabin, such as through one or more pivotal interfaces. At 802, the clearance panel is coupled to the fixed wall or the internal cabin through one or more shear pins.

At 804, a force is exerted into the monument wall assembly, and it is determined whether the force exceeds a predetermined deployment threshold, at which the shear pin(s) break. If the predetermined deployment threshold is not met or exceeded, the method proceeds to 806, in which the shear pin(s) maintain their structure and keep the clearance panel in a non-deployed state. The method then returns to 804. If, however, the exerted force does exceed the predetermined deployment threshold, the method proceeds from 804 to 808, in which the shear pin(s) break, and the clearance panel moves into a deployed state.

Figure 20:
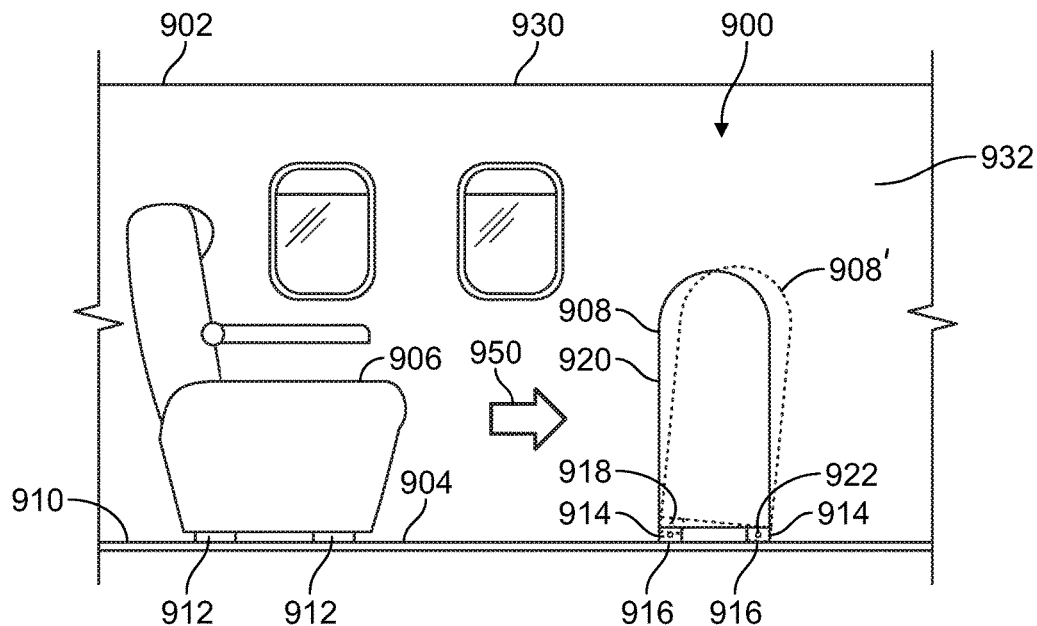
FIG. 20 illustrates a simplified internal view of an internal cabin of a vehicle, according to an embodiment of the present disclosure.

FIG. 20 illustrates a simplified internal view of an internal cabin 900 of a vehicle 902, according to an embodiment of the present disclosure. The internal cabin 900 includes a floor 904 that supports seats 906 and one or more monuments 908. The seats 906 may be secured to a seat track 910 through a plurality of fittings 912. Similarly, the monument 908 may be secured to the floor 904 through one or more fittings 914.

Each of the fittings 914 may include an anchored portion 916. One or more frangible elements 918 (such as one or more shear pins) connect aft fittings 914 to a main body 920 of the monument 908. The fore fittings 914 may include pivot hinges 922. The monument 908 may be any type of those described above. Optionally, the monument 908 may be secured to various other portions within the internal cabin 900, such as a ceiling 930, an outboard wall 932, the floor 904, and/or the like, through one or more fittings, mounts, fasteners, and/or the like, at least some of which may include frangible elements, such as shear pins.

When an ultimate load is exerted from aft to fore in the direction of arrow 950, the frangible element(s) 918 breaks or otherwise releases, and the ultimate load forces the main body 920 of the monument 908 to pivot forward about the pivot hinges 922, as indicated by dashed lines 908'. In this manner, additional head clearance space is provided when the ultimate load is exerted within the internal cabin 900.

Figure 21:
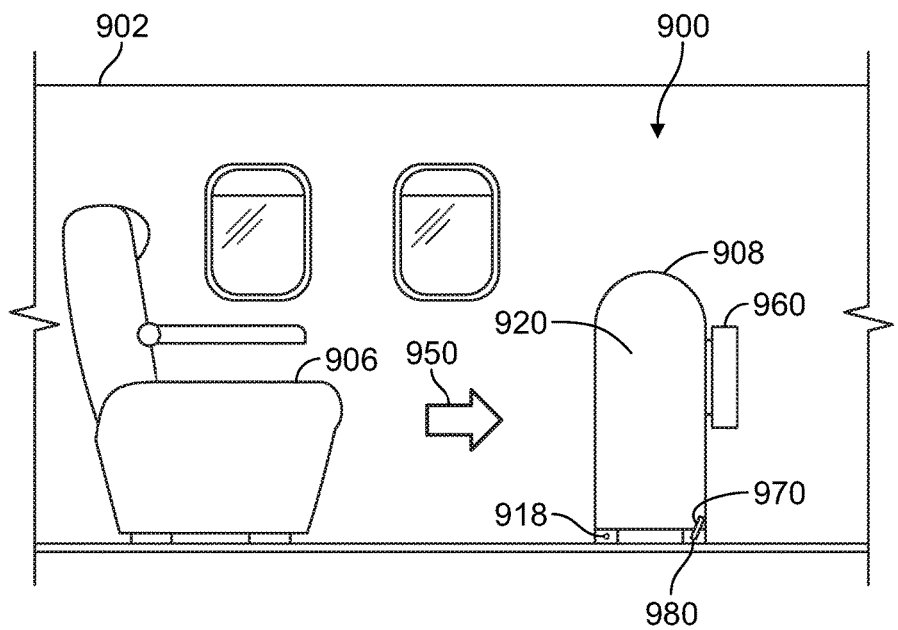
FIG. 21 illustrates a simplified internal view of an internal cabin of a vehicle, according to an embodiment of the present disclosure.

FIG. 21 illustrates a simplified internal view of the internal cabin 900 of the vehicle 902, according to an embodiment of the present disclosure. A fixture 960 may be secured to the monument 960. The fixture 960 may be an inflight entertainment system, literature rack, storage cabinet, changing table for infants, and/or the like). The fixture 960 provides a useful mass that ensures that the frangible elements 918 release when the ultimate load is exerted into the monument 908 in the direction of arrow 950, and not under normal operating loads. Further, a mechanical advantage device 970 (such as a lever) may be employed to define a pivot point or axis 980 about which the main body 920 pivots forward when the ultimate load is exerted in the direction of arrow 950.

Referring to FIGS. 20 and 21, the monument 908 itself is configured to move from a non-deployed state into a deployed state when the ultimate load is exerted into the monument 908 in the direction of arrow 950. The frangible elements 918 (such as shear pins(s)) may be located at extremities of the monument 908, such as proximate to or at floor fittings or ceiling fittings.

The monument 908 includes a deployable portion, such as the main body 920. The deployable portion is configured to move from a non-deployed state into a deployed state (shown in FIG. 20 as 908') when a force that meets or exceeds a predetermined threshold (such as the ultimate load) is exerted into the monument 908.

Referring to FIGS. 1-21, embodiments of the present disclosure provide systems and methods of safely positioning one or more seats within a cabin of an aircraft closer to a monument, in order to increase seating capacity within the aircraft. Embodiments of the present disclosure provide systems and methods of safely positioning one or more seats within a cabin of an aircraft closer to a monument while also complying with all relevant FAA safety requirements.

Embodiments of the present disclosure provide improved safety aboard a vehicle, better space utilization within an internal cabin of the vehicle, and a lightweight, simple, cost-effective, aesthetically unobtrusive, maintenance-free system and assembly.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A monument configured to be positioned within an internal cabin of a vehicle, the monument comprising:
    a deployable portion, wherein the deployable portion is configured to move from a non-deployed state into a deployed state when a force that meets or exceeds a predetermined threshold is exerted into the monument, the deployable portion comprising a deployable clearance panel within a monument wall assembly, the clearance panel being configured to move from the non-deployed state into the deployed state when the force that meets or exceeds a predetermined threshold is exerted into the monument wall assembly, the clearance panel comprising one or more bracing members that prevent the clearance panel from moving from the deployed state back to the non-deployed state, the one or more bracing members pivotally or slidably coupling the clearance panel to a fixed wall, and the one or more bracing members being configured to slide or pivot into an outwardly deployed position that prevents the clearance panel from moving from the deployed state back to the non-deployed state.

2. The monument of claim 1, wherein the clearance panel further comprises a first portion pivotally secured to the fixed wall, and a second portion coupled to the fixed wall by at least one release device, and wherein the at least one release device is configured to release upon exertion of the force that meets or exceeds the predetermined threshold.

3. The monument of claim 2, wherein the first portion comprises a lower end, and the second portion comprises an upper end.

4. The monument of claim 2, wherein the first portion comprises an upper end, and the second portion comprises a lower end.

5. The monument of claim 1, wherein the clearance panel comprises an upper segment pivotally connected to a lower segment.

6. The monument of claim 1, wherein the clearance panel is a pantographic clearance panel that is configured to move from the non-deployed state to the deployed state through pantographic motion.

7. The monument of claim 1, wherein the clearance panel comprises a first portion that is configured to pivotally secure to a floor of the internal cabin, and a second portion that is configured to couple to one of the fixed wall or a ceiling of the internal cabin by at least one shear pin, and wherein the at least one shear pin is configured to break upon exertion of the force that meets or exceeds the predetermined threshold.

8. The monument of claim 1, wherein the force that meets or exceeds the predetermined threshold is an ultimate load that is at least nine times the force of gravity.

9. The monument of claim 1, further comprising a covering over the clearance panel that conceals at least a portion of the clearance panel in the non-deployed state, wherein the covering is configured to tear proximate to an interface between the clearance panel and the fixed wall as the clearance panel moves from the non-deployed state into the deployed state.

10. The monument of claim 1, further comprising a fixture secured thereto, wherein the fixture provides a useful mass that facilitates movement into the deployed state when the force that meets or exceeds the predetermined threshold is exerted into the monument.

11. The monument of claim 10, wherein the fixture is secured to a fore surface or an aft surface of a clearance panel.

12. The monument of claim 1, wherein the deployable portion comprises a main body of the monument, and wherein the main body is configured to move from the non-deployed state into the deployed state when the force that meets or exceeds the predetermined threshold is exerted into the monument.

13. The monument of claim 12, wherein the main body is configured to be secured to a portion of the internal cabin through at least one fitting including an anchored portion that connects to the main body through a frangible portion.

14. The monument of claim 12, wherein the main body is configured to be secured to a portion of the internal cabin through at least one fitting including one or more pivot hinges.

15. The monument of claim 12, wherein the main body is configured to pivot forward when the force that meets or exceeds the predetermined threshold is exerted into the monument.

16. The monument of claim 12, further comprising one or more frangible elements located proximate to one or both of floor fittings or ceiling fittings.

17. The monument of claim 1, wherein the one or more bracing members are secured to outer lateral edges of the clearance panel.

18. A vehicle, comprising:
    an internal cabin;
    a plurality of seats within the internal cabin; and
    a monument proximate to at least one of the plurality of seats, wherein the monument includes a deployable portion, wherein the deployable portion is configured to move from a non-deployed state into a deployed state when a force that meets or exceeds a predetermined threshold is exerted into the monument, the deployable portion comprising a deployable clearance panel within a monument wall assembly, the clearance panel being configured to move from the non-deployed state into the deployed state when the force that meets or exceeds a predetermined threshold is exerted into the monument wall assembly, the clearance panel comprising one or more bracing members that prevent the clearance panel from moving from the deployed state back to the non-deployed state, the one or more bracing members pivotally or slidably coupling the clearance panel to a fixed wall, and the one or more bracing members being configured to slide or pivot into an outwardly deployed position that prevents the clearance panel from moving from the deployed state back to the non-deployed state.

19. The vehicle of claim 18, wherein the clearance panel further comprises a first portion pivotally secured to the fixed wall, and a second portion coupled to the fixed wall by at least one shear pin, and wherein the at least one shear pin is configured to break upon exertion of the force that meets or exceeds the predetermined threshold.

20. The vehicle of claim 18, wherein the clearance panel comprises a first portion that is configured to pivotally secure to a floor of the internal cabin, and a second portion that is configured to couple to one of the fixed wall or a ceiling of the internal cabin by at least one shear pin, and wherein the at least one shear pin is configured to break upon exertion of the force that meets or exceeds the predetermined threshold.

21. The vehicle of claim 18, wherein the monument wall assembly further comprises a covering over the clearance panel that conceals the clearance panel in the non-deployed state, wherein the covering is configured to tear proximate to an interface between the clearance panel and the fixed wall as the clearance panel moves from the non-deployed state into the deployed state.

22. The vehicle of claim 18, further comprising a fixture secured thereto, wherein the fixture provides a useful mass that facilitates movement into the deployed state when the force that meets or exceeds the predetermined threshold is exerted into the monument.

23. The vehicle of claim 18, wherein the deployable portion comprises a main body of the monument, and wherein the main body is configured to move from the non-deployed state into the deployed state when the force that meets or exceeds the predetermined threshold is exerted into the monument.

24. The vehicle of claim 23, wherein the main body is secured to a portion of the internal cabin through at least one fitting including an anchored portion that connects to the main body through a frangible portion.

25. The vehicle of claim 23, wherein the main body is secured to a portion of the internal cabin through at least one fitting including one or more pivot hinges.

26. The vehicle of claim 23, wherein the main body is configured to pivot forward when the force that meets or exceeds the predetermined threshold is exerted into the monument.

27. The vehicle of claim 23, further comprising one or more frangible elements located proximate to one or both of floor fittings or ceiling fittings.

28. The vehicle of claim 18, wherein the one or more bracing members are secured to outer lateral edges of the clearance panel.

29. A method of preventing a head strike with a monument within an internal cabin of a vehicle, the method comprising:

moveably securing a deployable portion of the monument to a fixed wall or a fixed portion of the internal cabin, the deployable portion comprising a deployable clearance panel within a monument wall assembly, the clearance panel comprising one or more bracing members;

pivotally or slidably coupling the clearance panel to the fixed wall with the one or more bracing members;

coupling the deployable portion to the fixed wall or the fixed portion of the internal cabin in a non-deployed state;

moving the deployable portion into a forward deployed state away from a passenger seat in response to exertion of a force meeting or exceeding a predetermined threshold into the monument, wherein the moving the deployable portion operation comprises moving the clearance panel from the non-deployed state into the forward deployed state when the force that meets or exceeds a predetermined threshold is exerted into the monument wall assembly; and preventing the clearance panel from moving from the forward deployed state back to the non-deployed state with the one or more bracing members, wherein the preventing operation comprises sliding or pivoting the one or more bracing members into an outwardly deployed position that prevents the clearance panel from moving from the forward deployed state back to the non-deployed state.

30. The method of claim 29, wherein the deployable portion comprises a main body of the monument.

31. The method of claim 29, wherein the moving operation comprises moving the deployable portion into the forward deployed state into an unoccupied or unused portion of a lavatory or a galley.

32. The method of claim 29, wherein the pivotally or sliding operation comprises securing the one or more bracing members to outer lateral edges of the clearance panel.

* * * * *